United States Patent
Kumar et al.

(10) Patent No.: US 10,588,186 B2
(45) Date of Patent: *Mar. 10, 2020

(54) OUTPUT CURRENT CONFIGURATION BASED ON LOAD CONNECTION

(71) Applicant: OSRAM SYLVANIA Inc., Wilmington, MA (US)

(72) Inventors: Nitin Kumar, Beverly, MA (US); Markus Ziegler, Watertown, MA (US); Naveen Tumula, Danvers, MA (US); Thomas Schalton, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,318

(22) Filed: Jul. 4, 2017

(65) Prior Publication Data

US 2017/0303355 A1 Oct. 19, 2017

Related U.S. Application Data

(63) Continuation of application No. 14/313,203, filed on Jun. 24, 2014, now Pat. No. 9,699,837.

(Continued)

(51) Int. Cl.
*H05B 33/08* (2020.01)
*H02M 3/24* (2006.01)
*H02M 3/33* (2006.01)
*H02M 3/335* (2006.01)
*H02M 1/00* (2006.01)

(52) U.S. Cl.
CPC .......... *H05B 33/0815* (2013.01); *H02M 3/24* (2013.01); *H02M 3/33507* (2013.01); *H05B 33/08* (2013.01); *H02M 2001/0025* (2013.01); *Y02B 20/348* (2013.01)

(58) Field of Classification Search
CPC .. Y02B 20/346; Y02B 20/186; Y02B 20/348; Y02B 70/1425; Y02B 70/1466; Y02B 70/1433; Y02B 20/341; H02M 3/33515; H02M 3/3376; H02M 1/4225; H02M 1/4258; H02M 1/44; H05K 2201/10106; H05B 33/0815; H05B 33/0824; H05B 37/02; H05B 33/0809; H05B 33/089; H05B 41/28; H05B 33/08; H05B 33/0806;

(Continued)

(56) References Cited

U.S. PATENT DOCUMENTS 7,449,873 B2 * 11/2008 Schaffer .................. G05F 3/262
 323/315
8,217,686 B2 * 7/2012 Falter ...................... H03K 17/18
 327/110

(Continued)

*Primary Examiner* — Vibol Tan
(74) *Attorney, Agent, or Firm* — Shaun P. Montana

(57) ABSTRACT

A driver port that provides selectable output currents based on connections thereto, and a driver including the same, is provided. A plurality of shunt resistors are connected in series between a negative output of a driver and a ground. A driver port having a plurality of connection points is provided, each respective connection point connected to a different connection between two of the plurality of shunt resistors. A load including one or more solid state light sources is capable of being connected between one of the connection points of the driver port and a positive output of the driver.

12 Claims, 4 Drawing Sheets

Related U.S. Application Data

(60) Provisional application No. 61/864,319, filed on Aug. 9, 2013.

(58) Field of Classification Search
CPC ............ H05B 33/0812; H05B 33/0887; H05B 33/0896; H05B 39/04; H05B 41/2828
See application file for complete search history.

(56) References Cited

U.S. PATENT DOCUMENTS

| | | | |
|---|---|---|---|
| 9,712,133 B2 * | 7/2017 | Bianchi | H03H 7/383 |
| 10,375,795 B2 * | 8/2019 | Davis | H05B 35/00 |

* cited by examiner

OUTPUT CURRENT CONFIGURATION BASED ON LOAD CONNECTION

CROSS-REFERENCE TO RELATED APPLICATIONS

The present application is a continuation of, and claims the benefit of, U.S. patent application Ser. No. 14/313,203, filed Jun. 24, 2014, now U.S. Pat. No. 9,699,837, which claims the benefit of priority of U.S. Provisional Patent Application No. 61/864,319, entitled "DRIVER FOR SOLID STATE LIGHT SOURCES", filed on Aug. 9, 2013, the entire contents of both which are hereby incorporated by reference.

TECHNICAL FIELD

The present invention relates to electronics, and more specifically, to electronics for lighting devices.

BACKGROUND

Solid state light sources require a driver (also referred to as a driver circuit and/or a power supply) that converts incoming alternating current (AC) power to the proper DC voltage, and regulates the current flowing through the light sources during operation. The driver converts 120V (or other voltages) 60 Hz AC power to DC power required by the light sources, and protects the light sources from line-voltage fluctuations. Output current may be configured for different values for different applications, usually by way of jumpers or digital configuration.

SUMMARY

Conventional drivers, such as those described above, suffer from a variety of deficiencies. One such deficiency is that configuring the driver for different currents for different applications requires the use of jumpers, which must be configured manually, or by digital configuration, which results in additional cost. Embodiments provide a driver that outputs different currents using a collection of shunt resistors coupled to a port, wherein different port connections provide different driver currents for a load.

In an embodiment, there is provided a driver port providing selectable output currents. The driver port providing selectable output currents includes: a plurality of shunt resistors connected in series between a negative output of a driver and a ground; a driver port having a plurality of connection points, wherein each respective connection point is connected to a different connection between two of the plurality of shunt resistors; wherein a load is capable of being connected between one of the connection points of the driver port and a positive output of the driver.

In a related embodiment, the plurality of connection points may provide different output currents for the load. In another related embodiment, the driver port may further include a driver for one or more solid state light sources in electrical communication with the driver port. In still another related embodiment, the driver may include: an EMI front end coupled to a voltage source, the EMI front end configured to provide a rectified direct current voltage; a boost PFC circuit coupled to the EMI front end and configured to provide a boosted voltage; an inverter coupled to the boost PFC circuit; a PFC and Half Bridge coupled to the boost PFC circuit and the inverter; an isolation transformer having a primary side coupled to the inverter; a rectifier coupled to a secondary side of the isolation transformer; and an output filter coupled to the rectifier, wherein an output of the output filter is coupled to the driver port. In a further related embodiment, the driver port may further include a regulator circuit in communication with the driver and the driver output port. In a further related embodiment, the regulator circuit may include a constant current constant voltage regulator. In a further related embodiment, the regulator circuit may include a first input in communication with the negative output of the driver, a second input in communication with the output of the output filter of the driver, and an output coupled to a primary side of the isolation transformer.

In another embodiment, there is provided a method of providing different currents to different loads. The method includes: providing a plurality of shunt resistors connected in series between a negative output of a driver of one or more solid state light sources and a ground; providing a driver port having a plurality of connection points, each respective connection point connected to a different connection between two of the plurality of shunt resistors; and connecting a load comprising one or more solid state light sources between one of the connection points of the driver port and a positive output of the driver.

In a related embodiment, providing different connection points may provide different output currents for the load. In another related embodiment, the method may further include placing the driver of one or more solid state light sources in electrical communication with the driver port. In a further related embodiment, placing the driver of one or more solid state light sources in electrical communication with the driver port may include: providing a driver of one or more solid state light sources, the driver may include: an EMI front end coupled to a voltage source, the EMI front end configured to provide a rectified direct current voltage; a boost PFC circuit coupled to the EMI front end and configured to provide a boosted voltage; an inverter coupled to the boost PFC circuit; a PFC and half bridge coupled to the boost PFC circuit and the inverter; an isolation transformer having a primary side coupled to the inverter; a rectifier coupled to a secondary side of the isolation transformer; and an output filter coupled to the rectifier, wherein an output of the output filter is coupled to the driver port. In a further related embodiment, the method may further include providing a regulator circuit in communication with the driver and the driver output port. In a further related embodiment, providing a regulator circuit in communication with the driver and the driver output port may include providing a constant current constant voltage regulator in communication with the driver and the driver output port.

In another further related embodiment, providing a regulator circuit may include providing a regulator circuit comprising a first input in communication with the negative output of the driver, a second input in communication with an output of the output filter of the driver, and an output coupled to a primary side of the isolation transformer.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
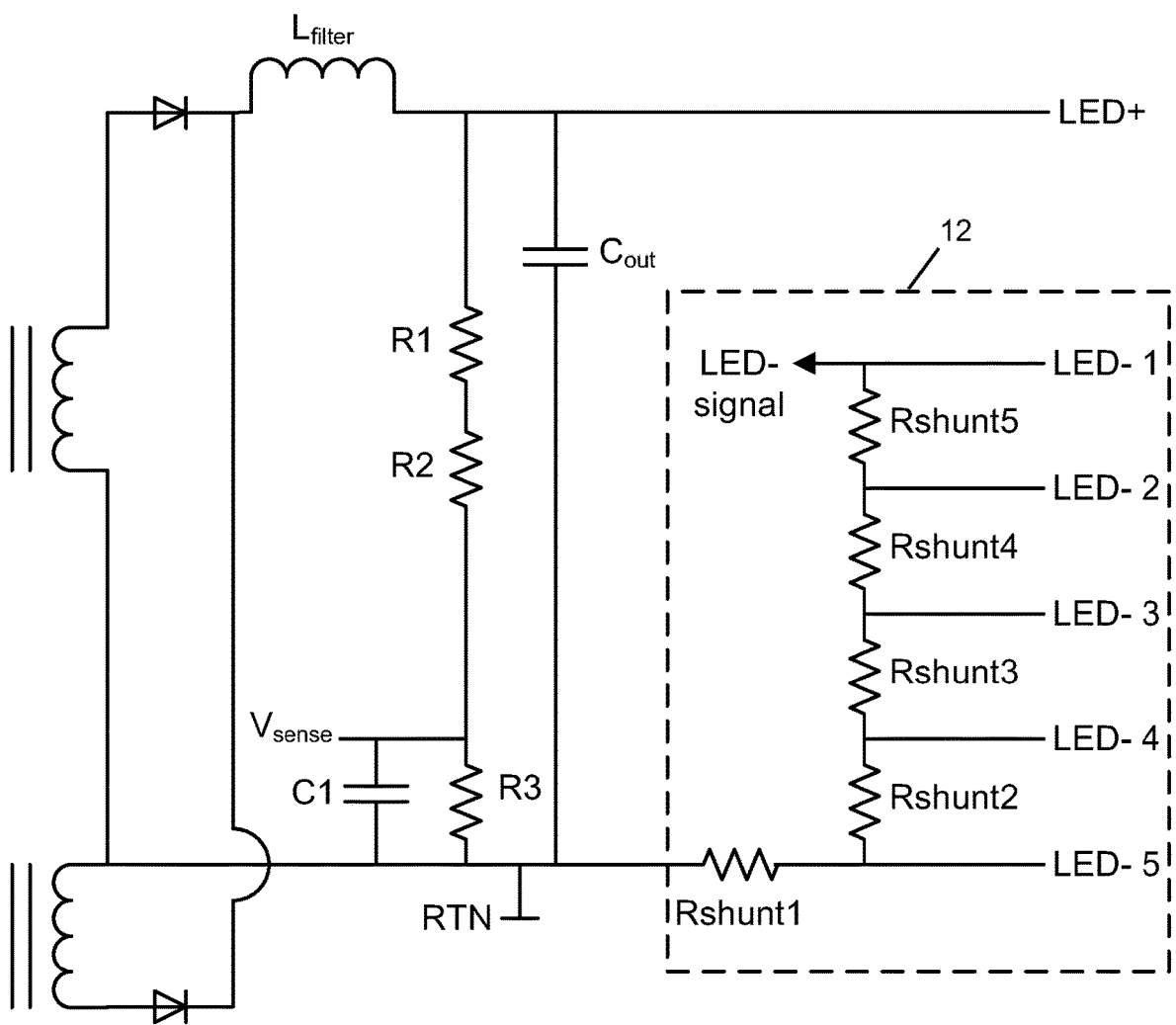
FIG. 1 shows a schematic diagram of a driver port according to embodiments disclosed herein.

FIG. 1 shows a schematic diagram of a driver port 12 for a driver 10 of one or more solid state light sources (such as but not limited to light emitting diodes (LEDs), organic light emitting diodes (OLEDs), polymer light emitting diodes (PLEDs), organic light emitting compounds (OLECs), and/or other semiconductor-based light sources, including combinations thereof). The driver port 12 includes a plurality of shunt resistors Rshunt1, Rshunt2, Rshunt3, Rshunt4, Rshunt5 connected in series between a negative output of the LED driver and a ground RTN. Although five shunt resistors are shown, it should be appreciated that embodiments are not limited to only five resistors and that any number of resistors may be used.

The driver port 12 includes a plurality of connection points LED-1, LED-2, LED-3, LED-4, LED-5 for a load, each respective connection point connected to a different connection between two of the plurality of shunt resistors Rshunt1, Rshunt2, Rshunt3, Rshunt4, Rshunt5. A load of one or more solid state light sources is capable of being connected between one of the plurality of connection points LED-1, LED-2, LED-3, LED-4, LED-5 of the driver port 12 and a positive output LED+ of the driver 10. A connection between the positive output LED+ and the connection point LED-1 results in a first current (Iout1) being provided to a load. A connection between the positive output LED+ and the connection point LED-2 results in a second current (Iout2) being provided to a load. A connection between the positive output LED+ and the connection point LED-3 results in a third current (Iout3) being provided to a load. A connection between the positive output LED+ and the connection point LED-4 results in a fourth current (Iout4) being provided to a load. A connection between the positive output LED+ and the connection point LED-5 results in a fifth current (Iout5) being provided to a load.

The output current provided to the load is related to the shunt resistance. As shunt resistance increases, the output current decreases. The connection point LED-5 provides the highest output current, as there is only one shunt resistor Rshunt1 between the output and ground. Concomitantly, the connection point LED-1 provides the lowest output current, since the shunt resistance between the output and ground is the sum of the shunt resistors Rshunt5 plus Rshunt4 plus Rshunt3 plus Rshunt2 plus Rshunt1. The connection point LED-4 provides a higher current than the connection point LED-1 and less than the connection point LED-5 since the shunt resistance between the output and ground is the sum of the shunt resistors Rshunt2 plus Rshunt1. The connection point LED-3 provides a higher current than the connection point LED-1 and less than the connection point LED-4 since the shunt resistance between the output and ground is the sum of the shunt resistors Rhunt3 plus Rshunt2 plus Rshunt1. The connection point LED-2 provides a higher current than the connection point LED-1 and less than the connection point LED-3 since the shunt resistance between the output and ground is the sum of the shunt resistors Rshunt4 plus Rhunt3 plus Rshunt2 plus Rshunt1.

Figure 2:
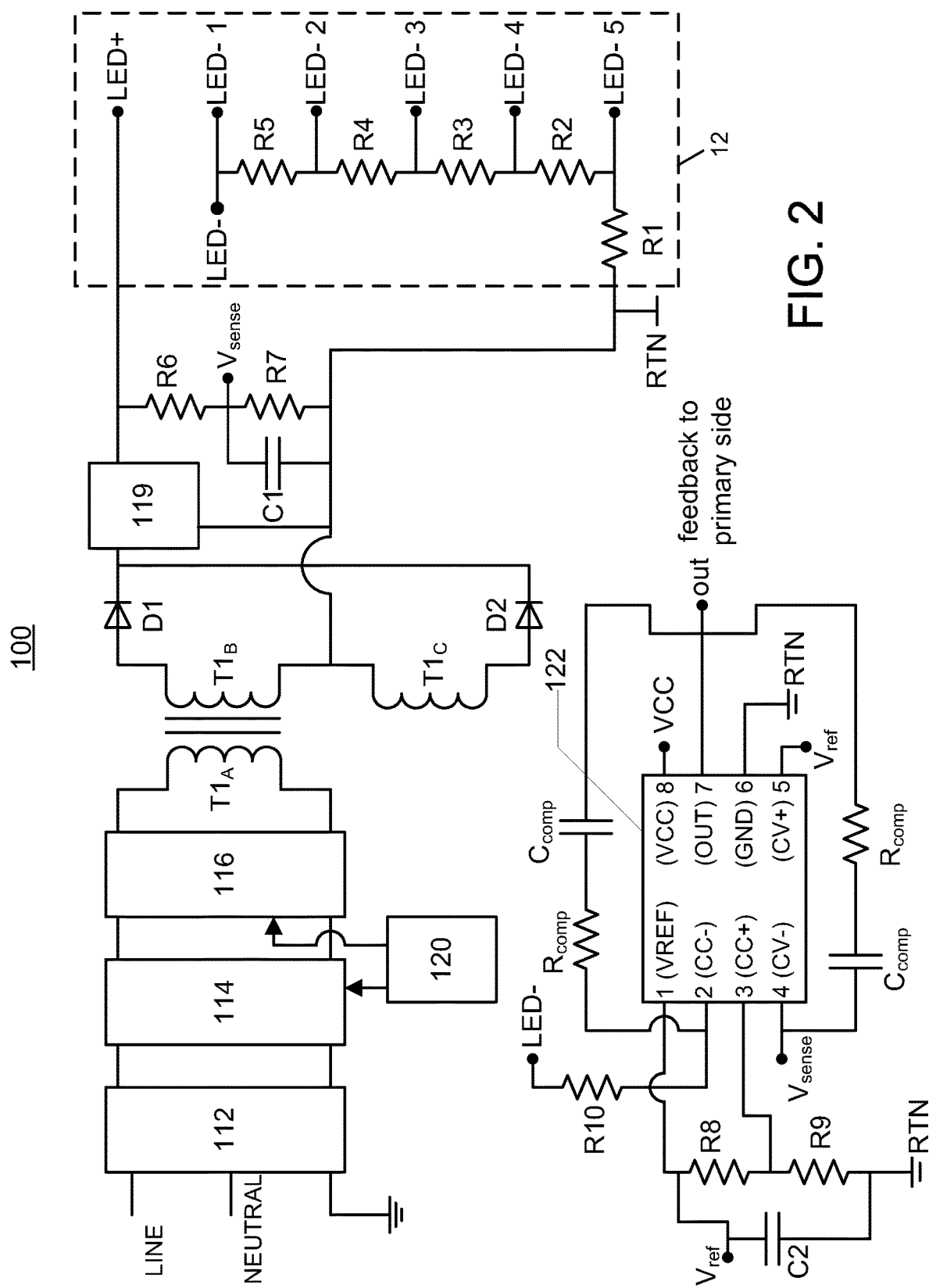
FIG. 2 depicts a schematic diagram of a driver for one or more solid state light sources including the driver port of FIG. 1 according to embodiments disclosed herein.

Referring now to FIG. 2, a driver of one or more solid state light sources 100 including the driver port 12 of FIG. 1 is shown. An AC voltage is provided to an EMI front end and rectifier 112, which provides a rectified DC voltage. This rectified DC voltage is provided to a boost PFC circuit 114, which outputs a boosted voltage (e.g., 450 volts DC). This boosted DC voltage is fed into an LCC half bridge inverter 116, which includes a resonant network with an LCC tank circuit (not shown). The output of the LCC half bridge inverter 116 is then provided to a primary side $T1_A$ of an isolation transformer T1. The isolation transformer T1 is used for isolation, and in some embodiments, provides a step up voltage, a step down voltage, or reflects the input voltage at the same level.

The output of the isolation transformer T1 is followed by a rectifier comprising diodes D1 and D2, which is followed by an output filter 119. The current from the output filter 119 is then provided to the driver port 12. All of the above described circuitry is driven by a PFC and half bridge 120, which provides a gate drive for the boost PFC circuit 114 and a gate drive for the LCC half bridge inverter 116. Also shown is a regulator circuit 122. The regulator circuit 122 comprises a constant current constant voltage (CCCV) regulator and is used to set the current to a certain value and sets the output voltage to a certain value. The regulator circuit 122 also provides additional functionality, in some embodiments, such as circuit protection. The regulator circuit 122 has an output connected to a primary side of the driver 100, an input connected to a connection point LED− of the driver, and a sense input $V_{sense}$ connected between a pair of resistors at the output of the output filter 119.

Figure 3A:
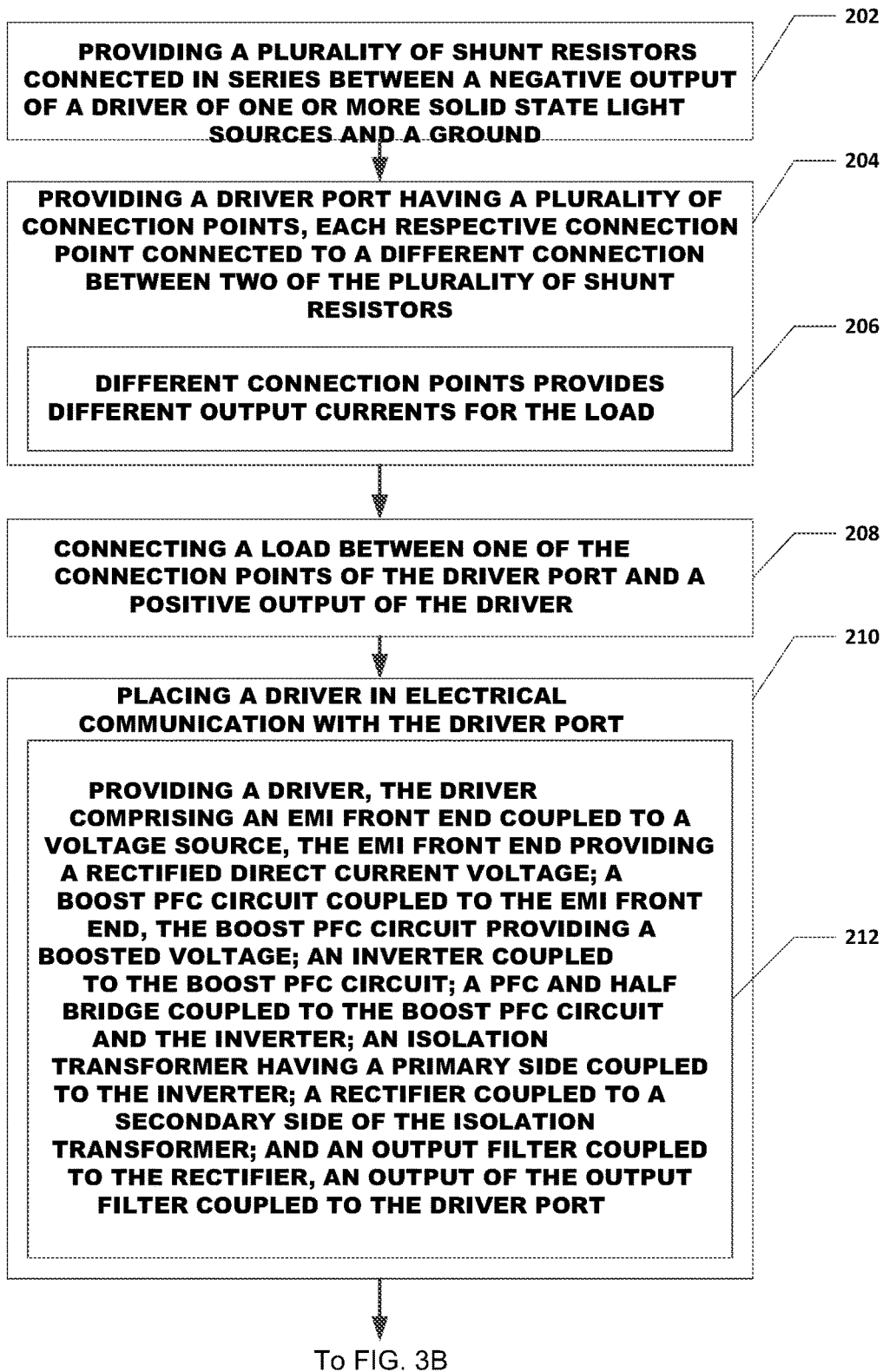
FIGS. 3A and 3B depict a flow diagram of a method for providing a driver port according to embodiments disclosed herein.
Figure 3B:
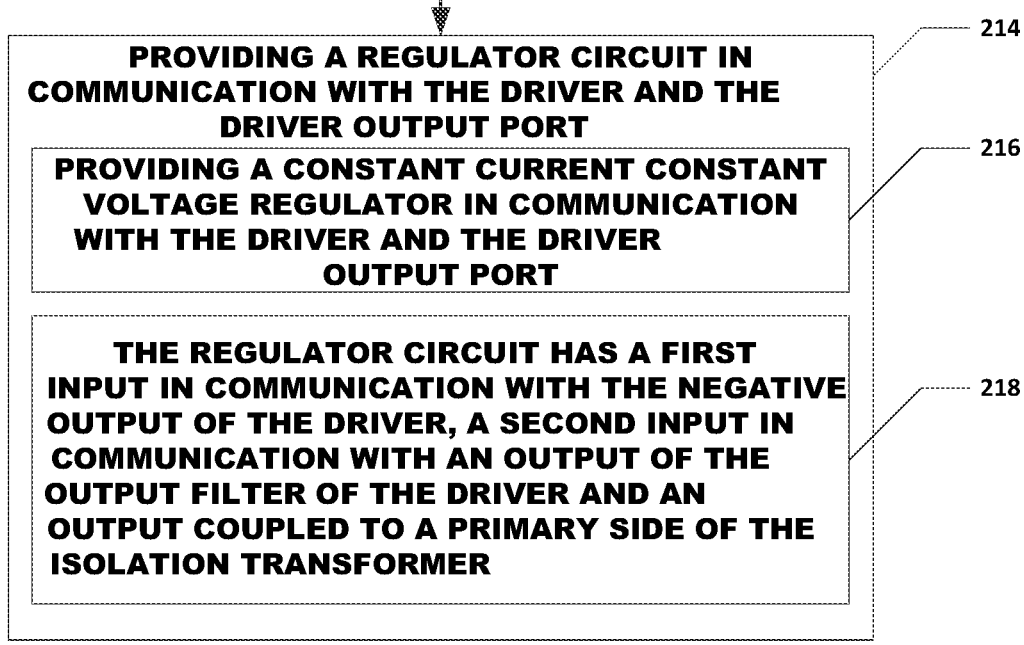

A flowchart of a method 300 is depicted in FIGS. 3A and 3B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 3A and 3B, the method 300 of providing different output currents at a driver port is shown. Processing begins with processing block 202, which discloses providing a plurality of shunt resistors connected in series between a negative output of a driver of one or more solid state light sources and a ground.

Processing block 204 states providing a driver port having a plurality of connection points, each respective connection point connected to a different connection between two of the plurality of shunt resistors. As shown in processing block 206, providing different connection points provides different output currents for the load.

Processing block 208 recites connecting a load between one of the connection points of the driver port and a positive output of the driver. In this manner, various loads having various different current requirements can be used with the same driver without requiring manual configuration (e.g., by way of jumper settings or the like) or without the requirement of digital configuration, which adds cost.

Processing continues with processing block 210, which discloses placing a driver in electrical communication with the driver port. The driver provides the voltage and current that the driver port uses to provide the different output currents. Processing block 212 discloses that the driver includes an EMI front end coupled to a voltage source, the EMI front end providing a rectified direct current voltage; a boost PFC circuit coupled to the EMI front end, the boost PFC circuit providing a boosted voltage; an inverter coupled to the boost PFC circuit; a PFC and Half Bridge coupled to the boost PFC circuit and the inverter; an isolation transformer having a primary side coupled to the inverter; a rectifier coupled to a secondary side of the isolation transformer; and an output filter coupled to the rectifier, an output of the output filter coupled to the driver port.

Processing block 214, shown in FIG. 3B, discloses providing a regulator circuit in communication with the driver and the driver output port. Processing block 216 states wherein providing a regulator circuit in communication with the driver and the driver output port comprises providing a constant current constant voltage regulator in communication with the driver and the driver output port. Processing block 218 recites wherein the regulator circuit has a first input in communication with the negative output of the driver, a second input in communication with an output of the output filter of the driver, and an output coupled to a primary side of the isolation transformer.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A driver port providing selectable output currents, comprising:
    a plurality of shunt resistors connected in series between a negative output of a driver and a ground;
    a driver port having a plurality of connection points, wherein each respective connection point is connected to a different connection between two of the plurality of shunt resistors;
    wherein a load is capable of being connected between one of the connection points of the driver port and a positive output of the driver.

2. The driver port of claim 1, wherein the plurality of connection points provide different output currents for the load.

3. The driver port of claim 1, further comprising a driver for one or more solid state light sources in electrical communication with the driver port.

4. The driver port of claim 1, wherein the driver comprises:
    an EMI front end coupled to a voltage source, the EMI front end configured to provide a rectified direct current voltage;
    a boost PFC circuit coupled to the EMI front end and configured to provide a boosted voltage;
    an inverter coupled to the boost PFC circuit;
    a PFC and Half Bridge coupled to the boost PFC circuit and the inverter;
    an isolation transformer having a primary side coupled to the inverter;
    a rectifier coupled to a secondary side of the isolation transformer; and
    an output filter coupled to the rectifier, wherein an output of the output filter is coupled to the driver port.

5. The driver port of claim 4, further comprising a regulator circuit in communication with the driver and the driver output port.

6. The driver port of claim 5, wherein the regulator circuit comprises a constant current constant voltage regulator.

7. The driver port of claim 6, wherein the regulator circuit comprises a first input in communication with the negative output of the driver, a second input in communication with the output of the output filter of the driver, and an output coupled to a primary side of the isolation transformer.

8. A method of providing different currents to different loads, comprising:
    providing a plurality of shunt resistors connected in series between a negative output of a driver of one or more solid state light sources and a ground;
    providing a driver port having a plurality of connection points, each respective connection point connected to a different connection between two of the plurality of shunt resistors; and
    connecting a load comprising one or more solid state light sources between one of the connection points of the driver port and a positive output of the driver.

9. The method of claim 8, wherein providing different connection points provides different output currents for the load.

10. The method of claim 8, further comprising placing the driver of one or more solid state light sources in electrical communication with the driver port.

11. The method of claim 10, wherein placing the driver of one or more solid state light sources in electrical communication with the driver port comprises:
    providing a driver of one or more solid state light sources, the driver comprising:
        an EMI front end coupled to a voltage source, the EMI front end configured to provide a rectified direct current voltage;
        a boost PFC circuit coupled to the EMI front end and configured to provide a boosted voltage;
        an inverter coupled to the boost PFC circuit;
        a PFC and half bridge coupled to the boost PFC circuit and the inverter;
        an isolation transformer having a primary side coupled to the inverter;
        a rectifier coupled to a secondary side of the isolation transformer; and
        an output filter coupled to the rectifier, wherein an output of the output filter is coupled to the driver port.

12. The method of claim 11, further comprising providing a regulator circuit in communication with the driver and the driver output port.

* * * * *